(12) United States Patent
Kim et al.

(10) Patent No.: US 12,014,566 B2
(45) Date of Patent: Jun. 18, 2024

(54) FINGERPRINT AUTHENTICATION DEVICE AND CALIBRATION DEVICE AND METHOD THEREOF

(71) Applicant: Samsung Display Co., Ltd., Yongin-Si (KR)

(72) Inventors: Kee Yong Kim, Yongin-si (KR); Jung Hun Sin, Yongin-si (KR); Young Sik Kim, Yongin-si (KR); Tae Joon Kim, Yongin-si (KR); Hee Woong Park, Yongin-si (KR); Sang Wook Yoo, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/132,262

(22) Filed: Apr. 7, 2023

(65) Prior Publication Data

US 2023/0326228 A1    Oct. 12, 2023

(30) Foreign Application Priority Data

Apr. 7, 2022   (KR) .......................... 10-2022-0043457

(51) Int. Cl.
*G06V 40/13* (2022.01)
*G06V 40/12* (2022.01)

(52) U.S. Cl.
CPC .......... *G06V 40/13* (2022.01); *G06V 40/1347* (2022.01); *G06V 40/1365* (2022.01)

(58) Field of Classification Search
CPC ............... G06V 40/13; G06V 40/1347; G06V 40/1365; G06V 10/243; G06V 40/1318; G06F 21/32
See application file for complete search history.

(56) References Cited

U.S. PATENT DOCUMENTS

| 9,235,746 B2 | 1/2016 | Jung et al. | |
| 2009/0226052 A1* | 9/2009 | Fedele | G06V 40/1359 382/199 |
| 2015/0071502 A1* | 3/2015 | Breznicky | G06F 21/32 382/115 |

FOREIGN PATENT DOCUMENTS

| KR | 10-2015-0034832 A | 4/2015 |
| KR | 10-1923335 B1 | 2/2019 |
| WO | 2017076292 A1 | 5/2017 |

* cited by examiner

*Primary Examiner* — Abhishek Sarma
(74) *Attorney, Agent, or Firm* — Innovation Counsel LLP

(57) ABSTRACT

Provided is a fingerprint authentication device comprising a biometric sensor that senses biometric information to generate a sensing signal; an image processor that extracts a calibration function based on calibration data and generates a fingerprint image based on the calibration function and the sensing signal; and an authenticator that performs fingerprint authentication by comparing the fingerprint image and registered fingerprint information. The calibration data includes information on a calibration coefficient of the calibration function.

18 Claims, 10 Drawing Sheets

FINGERPRINT AUTHENTICATION DEVICE AND CALIBRATION DEVICE AND METHOD THEREOF

CROSS-REFERENCE TO RELATED APPLICATION

This application claims priority to and the benefit of Korean Patent Application No. 10-2022-0043457 filed in the Korean Intellectual Property Office on Apr. 7, 2022, the entire contents of which are incorporated herein by reference.

BACKGROUND

(a) Technical Field

The present disclosure generally relates to a fingerprint authentication device and a calibration device and method thereof. More particularly, the present disclosure relates to a fingerprint authentication device and a calibration device and method thereof that may improve characteristic distribution of sensor pixels and minimize storage capacity of a memory in which calibration data for calibrating characteristic distribution of sensor pixels is stored.

(b) Description of the Related Art

Recently, as functions usable in electronic devices diversify, security of information stored in the electronic devices is important, and authentication technologies based on user's biometric information are being developed for such security needs.

The authentication technologies based on the biometric information may include, for example, obtaining biometric information such as fingerprint, iris, voice, face, and blood vessels from a user, and comparing the obtained biometric information with biometric information of a pre-registered user to determine whether the user is an authenticated user. Among the biometric information mentioned above, the fingerprint recognition technology is currently the most commercially available for various reasons such as convenience, security, and economic feasibility. The fingerprint recognition technology may enhance security for user devices, and may easily provide various application services such as mobile payment.

As an electronic device, a display device such as a smart phone and a wearable device that are provided with a fingerprint sensor for sensing a user's fingerprint is widely used.

SUMMARY

An object of the present disclosure is to provide a fingerprint authentication device and a calibration device and method thereof that may improve characteristic distribution of sensor pixels.

Another object of the present disclosure is to provide a fingerprint authentication device and a calibration device and method thereof that may minimize storage capacity of a memory in which calibration data for calibrating characteristic distribution of sensor pixels is stored.

An embodiment of the present disclosure provides a fingerprint authentication device, including: a biometric sensor that senses biometric information to generate a sensing signal; an image processor that extracts a calibration function based on calibration data and generates a fingerprint image based on the calibration function and the sensing signal; and an authenticator that performs fingerprint authentication by comparing the fingerprint image and registered fingerprint information. The calibration data may include information on a calibration coefficient of the calibration function.

In an embodiment, the calibration function may include a first calibration function having a first gain value with respect to a distance along a first direction of the fingerprint image and a second calibration function having a second gain value with respect to a distance along a second direction different from the first direction of the fingerprint image. The calibration coefficient may include a first calibration coefficient value of the first calibration function and a second calibration coefficient value of the second calibration function.

In an embodiment, each of the first calibration function and the second calibration function may be a multi-order function.

In an embodiment, the image processor may extract the multi-order function having the first calibration coefficient value as the first calibration function, and may extract the multi-order function having the second calibration coefficient value as the second calibration function.

In an embodiment, the sensing signal may have an analog voltage level, and the image processor may calibrate the analog voltage level of the sensing signal corresponding to the first direction based on the first gain value of the first calibration function, and may calibrate the analog voltage level of the sensing signal corresponding to the second direction based on the second gain value of the second calibration function.

In an embodiment, the fingerprint authentication device may further include a memory that stores the calibration data.

An embodiment of the present disclosure provides a calibration device of a fingerprint authentication device, including: a characteristic function extractor that receives a test image with respect to the fingerprint authentication device and extracts a characteristic function of the test image; a calibration function calculator that calculates a reference value of the characteristic function and calculates a calibration function based on the characteristic function and the reference value; and a calibration data generator that generates calibration data by extracting a calibration coefficient of the calibration function.

In an embodiment, the characteristic function may include a first characteristic function and a second characteristic function. The characteristic function extractor may extract the first characteristic function having a first characteristic value with respect to a distance along a first direction based on an average grayscale value with respect to the distance along the first direction of the test image, and may extract the second characteristic function having a second characteristic value with respect to a distance along a second direction based on an average grayscale value with respect to the distance along the second direction different from the first direction of the test image.

In an embodiment, each of the first characteristic function and the second characteristic function may be multi-order functions.

In an embodiment, the reference value may include a first reference value and a second reference value. The calibration function calculator may calculate an average value of the first characteristic value as the first reference value, and an average value of the second characteristic value as the second reference value.

In an embodiment, the calibration function may include a first calibration function and a second calibration function. The calibration function calculator may calculate the first calibration function having a first gain value with respect to a distance along the first direction by symmetrically shifting the first characteristic function based on the first reference value, and may calculate the second calibration function having a second gain value with respect to a distance along the second direction by symmetrically shifting the second characteristic function based on the second reference value.

In an embodiment, each of the first calibration function and the second calibration function may be a multi-order function.

In an embodiment, the calibration data generator may extract a first calibration coefficient value of the first calibration function and a second calibration coefficient value of the second calibration function. The calibration data may include the first calibration coefficient value and the second calibration coefficient value.

An embodiment of the present disclosure provides a calibration method of a fingerprint authentication device, including: obtaining a test image with respect to the fingerprint authentication device; extracting a characteristic function of the test image; calculating a reference value of the characteristic function; calculating a calibration function based on the characteristic function and the reference value; and extracting a coefficient of the calibration function.

In an embodiment, the characteristic function may include a first characteristic function and a second characteristic function. The extracting of the characteristic function may be accomplished by extracting the first characteristic function including a first characteristic value with respect to a distance along a first direction based on an average grayscale value with respect to the distance along the first direction of the test image; and extracting the second characteristic function including a second characteristic value with respect to a distance along a second direction based on an average grayscale value with respect to the distance along the second direction different from the first direction of the test image.

In an embodiment, each of the first characteristic function and the second characteristic function may be a multi-order function.

In an embodiment, the reference value may include a first reference value and a second reference value. The calculating of the reference value may be accomplished by calculating an average value of the first characteristic value as the first reference value; and calculating an average value of the second characteristic value as the second reference value.

In an embodiment, the calibration function may include a first calibration function and a second calibration function. The calculating of the calibration function may include: calculating the first calibration function including a first gain value with respect to a distance along the first direction by symmetrically shifting the first characteristic function based on the first reference value, and calculating the second calibration function including a second gain value with respect to a distance along the second direction by symmetrically shifting the second characteristic function based on the second reference value.

In an embodiment, each of the first calibration function and the second calibration function may be a multi-order function.

In an embodiment, the extracting of the coefficient of the calibration function may be accomplished by extracting a first calibration coefficient value of the first calibration function and a second calibration coefficient value of the second calibration function; and generating calibration data including the first calibration coefficient value and the second calibration coefficient value.

DETAILED DESCRIPTION OF THE EMBODIMENTS

Figure 1:
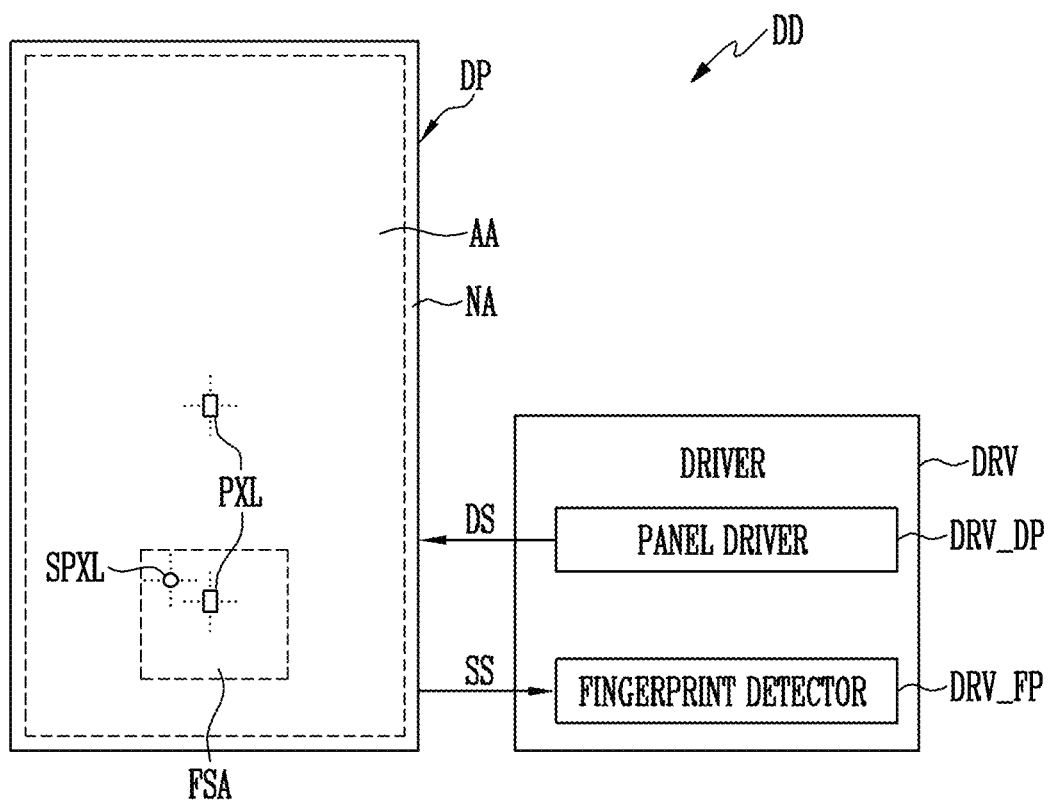
FIG. 1 illustrates a block diagram of a display device according to embodiments of the present disclosure.

Like reference numerals are used for like constituent elements in describing each drawing. In the accompanying drawings, the dimensions of the structure are exaggerated and shown for clarity of the present disclosure. Terms such as first, second, and the like will be used only to describe various constituent elements, and are not to be interpreted as limiting these constituent elements. The terms are only used to differentiate one constituent element from other constituent elements. For example, a first constituent element could be termed a second constituent element, and similarly, a second constituent element could be termed as a first constituent element, without departing from the scope of the present disclosure. Singular forms are intended to include plural forms unless the context clearly indicates otherwise.

In the present application, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

It will be understood that when an element such as a layer, film, region, area, or substrate is referred to as being "on" another element, it can be directly on the other element or intervening elements may also be present. In addition, in the present specification, when an element of a layer, film, region, area, plate, or the like is referred to as being formed "on" another element, the formed direction is not limited to an upper direction but includes a lateral or lower direction. In contrast, when an element of a layer, film, region, area, plate, or the like is referred to as being "below" another element, it may be directly below the other element, or intervening elements may be present.

Hereinafter, an embodiment of the present disclosure will be described in detail with reference to the accompanying drawings. The same reference numerals are used for the same constituent elements on the drawings, and duplicate descriptions for the same constituent elements are omitted.

FIG. 1 illustrates a block diagram of a display device according to embodiments of the present disclosure.

For convenience, in FIG. 1, a display panel DP and a driver DRV are separated and illustrated, but the present disclosure is not limited thereto. For example, all or a portion of the driver DRV may be integrally implemented on the display panel DP.

Referring to FIG. 1, a display device DD may include the display panel DP and the driver DRV. The driver DRV may include a panel driver DRV_DP and a fingerprint detector DRV_FP (or a fingerprint authenticator).

All or at least a portion of the display device DD may be flexible.

The display panel DP may include a display area AA and a non-display area NA. The display area AA is an area in which a plurality of pixels PXL (which may be referred to as subpixels) are provided, and may be referred to as an active area. Each of the pixels PXL may include at least one light emitting element. The display device DD may display an image in the display area AA by driving the pixels PXL in response to image data inputted from the outside.

In the embodiment, the display area AA may include a sensing area FSA (or a fingerprint sensing area). The fingerprint sensing area FSA may overlap at least some of the pixels PXL provided in the display area AA. In the embodiment, as shown in FIG. 1, at least a portion of the display area AA may be set as the fingerprint sensing area FSA.

Meanwhile, FIG. 1 illustrates an example in which only one fingerprint sensing area FSA is formed in the display area AA, but the present disclosure is not limited thereto. For example, a plurality of fingerprint sensing areas FSA may be regularly or irregularly arranged in the display area AA.

The non-display area NA is an area disposed around the display area AA, and may be referred to as a non-active area. For example, the non-display area NA may include a wire area, a pad area, and various dummy areas.

In the embodiments, the display device DD may further include a plurality of sensor pixels SPXL provided in the fingerprint sensing area FSA.

In the embodiment, the sensor pixels SPXL may be configured as photo sensors for sensing light. The sensor pixels SPXL may output a corresponding electrical signal (for example, a voltage signal) by sensing a reflected light when light emitted from a light source (or the pixel PXL) provided in the display device DD is reflected by a user's finger. An electrical signal of each sensor pixel SPXL may configure one point (that is, a point of contrast or pixel, which is a minimum unit configuring a fingerprint image) within the fingerprint image. Depending on whether the reflected light incident on respective sensor pixels SPXL is reflected by a valley of the fingerprint (or a palm or skin pattern) formed on the user's finger (or, palm or skin) or by a ridge thereof, the reflected light may have different light characteristics (for example, frequency, wavelength, size, etc.). Accordingly, the sensor pixels SPXL may output sensing signals SS having different electrical characteristics corresponding to the light characteristics of the reflected light.

When the sensor pixels SPXL are disposed in the fingerprint sensing area FSA, the sensor pixels SPXL may overlap the pixels PXL or may be disposed around the pixels PXL. For example, some or all of the sensor pixels SPXL may overlap the pixels PXL or may be disposed between the pixels PXL. In various embodiments, the sensor pixels SPXL and the pixels PXL may have the same or different sizes. A relative size and arrangement between sensor pixels SPXL and the pixels PXL are not particularly limited.

When the sensor pixels SPXL are disposed adjacent to the pixels PXL or overlap at least a portion thereof, the sensor pixels SPXL may use a light emitting element provided in the pixel PXL as a light source. In this embodiment, the sensor pixels SPXL may configure a photo-sensing type fingerprint sensor together with the light emitting elements provided in the pixels PXL. As such, when a fingerprint sensor-embedded display device is configured using the pixels PXL as light sources without a separate external light source, a module thickness of the fingerprint sensor of a photo-sensing type and the display device having the same may be reduced, and a manufacturing cost may be reduced.

In the embodiment, the sensor pixels SPXL may configure an ultrasonic wave sensor for sensing an ultrasonic wave. The sensor pixels SPXL may emit an ultrasonic wave signal, and may sense an ultrasonic wave reflected by a user's finger to output corresponding electrical signals (or the sensing signal SS).

In the embodiment, the sensor pixels SPXL may configure a capacitive sensor of which capacitance is changed according to a shape of a fingerprint.

In various embodiments, the sensor pixels SPXL may be disposed on another surface (for example, a rear surface) opposite to a surface (for example, a front surface) on which an image is displayed among opposite surfaces of the display panel DP. However, the present disclosure is not limited thereto. For example, the sensor pixels SPXL may be disposed closer to the front surface of the display panel DP than the pixels PXL that emit light.

The driver DRV may drive the display panel DP. For example, the driver DRV may output a data signal DS corresponding to image data to the display panel DP. In addition, the driver DRV may output a driving signal for the sensor pixel SPXL, and receive electrical signals (for example, sensing signal SS) from the sensor pixels SPXL. The driver DRV may detect a user's fingerprint type by using the electrical signals.

In some embodiments, the driver DRV may include the panel driver DRV_DP and the fingerprint detector DRV_FP. Each of the panel driver DRV_DP and the fingerprint detector DRV_FP may be implemented as an integrated circuit, and may be mounted on a flexible circuit board. The panel driver DRV_DP may be connected to the display panel DP through a flexible circuit board, and the fingerprint detector DRV_FP may be connected to the sensor pixels SPXL. In FIG. 1, the panel driver DRV_DP and the fingerprint detector DRV_FP are separately shown, but the present disclosure is not limited thereto. For example, at least a portion of the fingerprint detector DRV_FP may be integrated with the panel driver DRV_DP, or may operate in conjunction with the panel driver DRV_DP.

The panel driver DRV_DP may supply the data signal DS corresponding to image data to the pixels PXL while sequentially scanning the pixels PXL of the display area AA. Thus, the display panel DP may display an image corresponding to the image data.

The fingerprint detector DRV_FP may detect or recognize a fingerprint based on the sensing signal SS provided from the sensor pixels SPXL. For example, the fingerprint detector DRV_FP may convert the sensing signal SS into a fingerprint image (or fingerprint image data), and may perform fingerprint authentication based on the fingerprint image. The sensor pixels SPXL and the fingerprint detector DRV_FP may configure a fingerprint authentication device FDD (or a fingerprint detection device).

In the embodiment, the fingerprint detector DRV_FP may generate and store a fingerprint or a template thereof based on a fingerprint image sensed in a fingerprint registration mode. Here, the template may include at least one fingerprint image serving as a reference (or comparison reference) during fingerprint authentication.

The fingerprint may include ridges and valleys that form curvature of a surface of a finger. The fingerprint image is a representation of these ridges and valleys, and the ridges may be typically represented as dark lines, and the valleys between the ridges may be relatively brightly represented.

In the embodiment, the fingerprint detector DRV_FP may perform fingerprint authentication by comparing the fingerprint image (that is, data obtained through the sensing operation of the sensor pixels SPXL) obtained in the fingerprint authentication mode with the registered fingerprint information (that is, the template).

Figure 2A:
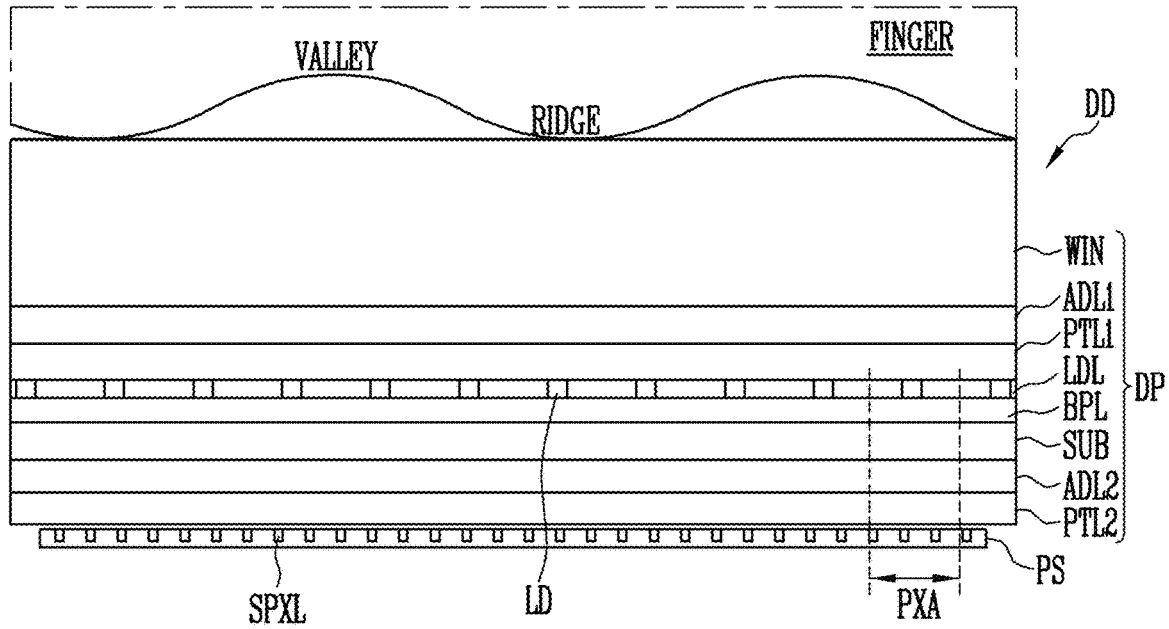
FIG. 2A illustrates a cross-sectional view of an example of the display device of FIG. 1.

FIG. 2A illustrates a cross-sectional view of an example of the display device of FIG. 1.

Referring to FIG. 1 and FIG. 2A, the display device DD may include the display panel DP and a biometric sensor PS (or fingerprint sensor) disposed on a lower surface of the display panel DP, in the fingerprint sensing area FSA. In addition, the display device DD may include a substrate SUB, and a circuit element layer BPL, a light emitting element layer LDL, a first passivation layer PTL1, a first adhesive layer ADL1, and a window WIN that are sequentially disposed on an upper surface of the substrate SUB. In addition, the display device DD may further include a second adhesive layer ADL2 and a second passivation layer PTL2 sequentially disposed on the lower surface of the substrate SUB in the fingerprint sensing area FSA.

The substrate SUB may be a base substrate for the display panel DD, and may be a substantially transparent transmissive substrate. The substrate SUB may be a rigid substrate including glass or tempered glass, or a flexible substrate made of plastic material. However, the material of the substrate SUB is limited thereto, and the substrate SUB may be made of various materials.

The circuit element layer BPL may be disposed on the upper surface of the substrate SUB, and may include at least one conductive layer. For example, the circuit element layer BPL may include a plurality of circuit elements forming a pixel circuit of the pixels PXL, and wires for supplying various power sources and signals for driving the pixels PXL. In this case, the circuit element layer BPL may include various circuit elements such as at least one transistor and capacitor, and a plurality of conductive layers for forming wires connected to the various circuit elements. In addition, the circuit element layer BPL may include at least one insulation layer provided between the plurality of conductive layers.

The light emitting element layer LDL may be disposed on an upper surface of the circuit element layer BPL. The light emitting element layer LDL may include a plurality of light emitting elements LD connected to circuit elements and/or wires of the circuit element layer BPL through a contact hole or the like. Each of the light emitting elements LD may be disposed to correspond to the pixel area PXA.

In the embodiment, at least one of the light emitting elements LD may be provided for each pixel PXL. For example, the light emitting element LD may be configured of an organic light emitting diode or an inorganic light emitting diode such as a micro light emitting diode and a quantum dot light emitting diode. In addition, the light emitting element LD may be a light emitting element complexly made of organic and inorganic materials. Further, each pixel PXL may include a single light emitting element, or in another embodiment, each pixel PXL may include a plurality of light emitting elements, and the plurality of light emitting elements may be connected in series, parallel, or in series and parallel to each other.

The first passivation layer PTL1 may be disposed on the light emitting element layer LDL to cover the display area AA. The first passivation layer PTL1 may include a sealing member such as a thin film encapsulation (TFE) or encapsulation substrate, and may additionally include a protective film in addition to the sealing member.

The first adhesive layer ADL1 may be disposed between the first passivation layer PTL1 and the window WIN to bond the first passivation layer PTL1 and the window WIN together. The first adhesive layer ADL1 may include a transparent adhesive such as an optical clear adhesive (OCA), and may include various adhesive materials.

The window WIN may be a protective member disposed at an uppermost portion of the display device DD including the display panel DP, and may be a light-transmitting substrate. The window WIN may have a multi-layered structure selected from a glass substrate, a plastic film, and a plastic substrate. The window WIN may include a rigid or flexible substrate, and the material included in the window WIN is not particularly limited.

In various embodiments, the display device DD may further include a polarizing plate, an anti-reflection layer, and/or a touch sensor layer (touch electrode layer), which are not shown. For example, the display device DD may further include a polarizing plate and/or touch sensor layer disposed between the first passivation layer PTL1 and the window WIN.

The second passivation layer PTL2 may be disposed on the other surface of the substrate SUB. That is, the second passivation layer PTL2 may be disposed opposite side from the first passivation layer PTL1 with respect to the substrate SUB. The second passivation layer PTL2 may be bonded to the substrate SUB by the second adhesive layer ADL2. The second adhesive layer ADL2 may include a transparent adhesive such as OCA. The second adhesive layer ADL2 may include a pressure sensitive adhesive (PSA) that acts as an adhesive material when pressure to adhere to an adhesive surface is applied thereto.

The second passivation layer PTL2 prevents oxygen and moisture from being introduced from the outside, and may be formed as a single layer or multilayer. The second passivation layer PTL2 may be formed in a film form to further secure flexibility of the display panel DD. The second passivation layer PTL2 may be combined with the biometric sensor PS through another adhesive layer (not shown) including a transparent adhesive such as OCA.

In the embodiment, when the biometric sensor PS includes a photo sensor, a selective light blocking film may be further provided under the second passivation layer PTL2. The selective light blocking film may block a specific frequency band, for example, infrared rays in external light directed to the display device DD to prevent the corresponding light from being directed to the sensor pixels SPXL of the biometric sensor PS.

The biometric sensor PS may be disposed on the lower surface (or rear surface) of the display panel DP through an adhesive or the like to overlap at least one area of the display panel DP. For example, the biometric sensor PS may be disposed to overlap the display panel DP in the fingerprint sensing area FSA. However, the present disclosure is not limited thereto, and the biometric sensor PS may be disposed on the upper surface (or the front surface) of the display panel DP. The biometric sensor PS may include a plurality of sensor pixels SPXL dispersed at a predetermined resolution and/or interval.

In the embodiment, when the biometric sensor PS includes a photo sensor, an optical system for condensing light directed to the biometric sensor PS to provide a light path may be provided on the biometric sensor PS. A width of a light transmitting portion that guides light in the optical system may be determined in consideration of sensing precision and light conversion efficiency. A condensing rate of light incident on the biometric sensor PS may be improved by the optical system. In some embodiments, the optical system may be formed of an optical fiber, silicon, and the like.

The sensor pixels SPXL may have an appropriate number, size, and arrangement so that an identifiable fingerprint image may be generated from electrical signals outputted by the sensor pixels SPXL. Intervals between the sensor pixels SPXL may be densely set so that light reflected from an observation object (for example, fingerprint) may be incident on at least two adjacent sensor pixels SPXL.

Figure 2B:
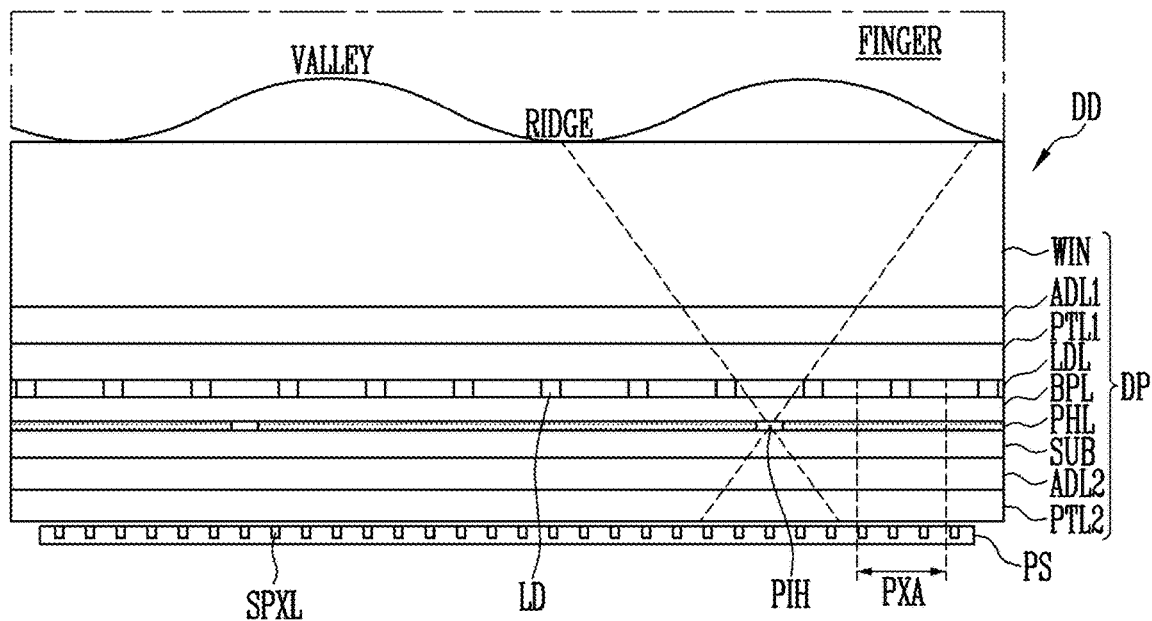
FIG. 2B illustrates a cross-sectional view of another example of the display device of FIG. 1.

FIG. 2B illustrates a cross-sectional view of another example of the display device of FIG. 1.

Referring to FIG. 1 and FIG. 2B, the display device DD including a function as an optical system may further include a light blocking layer PHL wherein a plurality of pinholes PIH may be defined in the light blocking layer PHL. That is, the light blocking layer PHL may be disposed between the circuit element layer BPL and the substrate SUB. The light blocking layer PHL may be disposed within the display panel DD or between the display panel DD and the sensor pixels SPXL to block a portion of light incident to the sensor pixels SPXL. For example, a portion of the light incident on the light blocking layer PHL may be blocked, and the remaining portion thereof may pass through the pinholes PIH to reach sensor pixels SPXL under the light blocking layer PHL.

The pinhole PIH may mean an optical hole, and may be a kind of light-transmitting hole. For example, the pinholes PIH may be light-transmitting holes having the smallest size (area) among light-transmitting holes in which layers of the display device DD overlap each other, on a path that the reflected light passes through the display panel DD in a diagonal or vertical direction to be incident on the sensor pixels SPXL.

The pinholes PIH may have a predetermined width, for example, a width having a range from 5 µm to 20 µm. In this way, as it moves away from the light blocking layer PHL (that is, as it moves in an upper or lower direction of the light blocking layer PHL), a width of an optical opening area to be secured in each layer of the display device DD may gradually increase.

Only reflected light passing through the pinholes PIH may reach the sensor pixels SPXL of the biometric sensor PS. A phase of light reflected from the fingerprint by the pinhole PIH having a very narrow width and a phase of an image formed on the biometric sensor PS may have a difference of 180 degrees.

The sensor pixels SPXL may output the sensing signal SS corresponding to the received reflected light, for example, a voltage signal.

However, this is an example, and the configuration, arrangement, and driving method of the photo sensor for detecting the reflected light from a fingerprint is not limited to the biometric sensor PS of FIG. 2B.

Figure 2C:
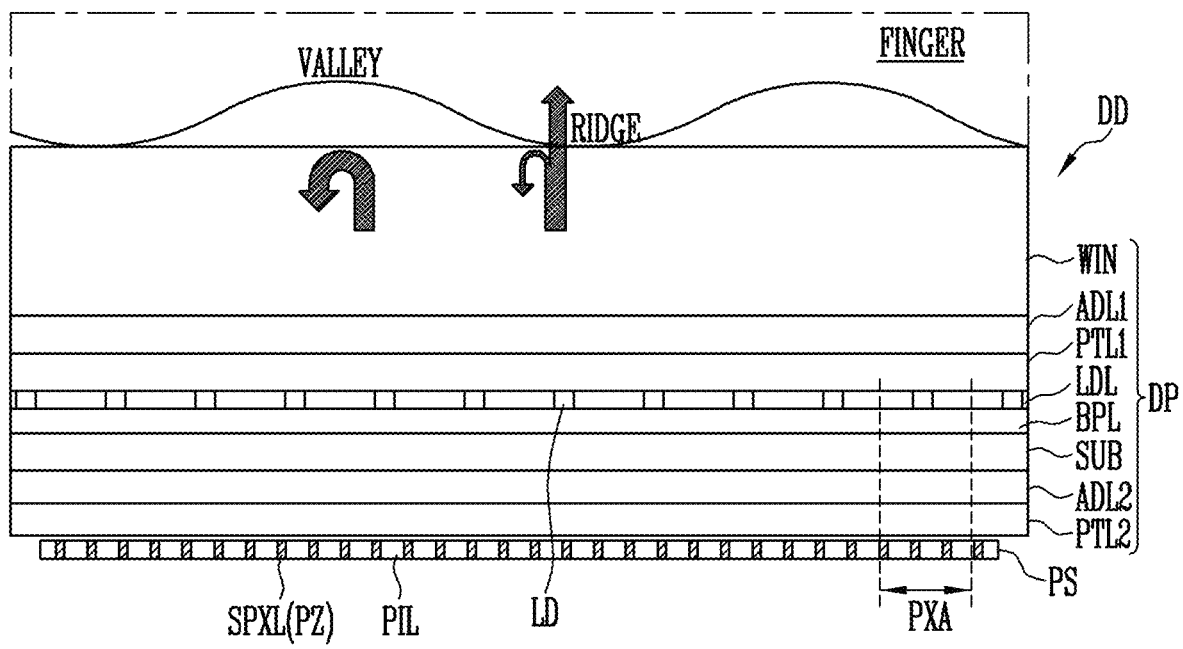
FIG. 2C illustrates a cross-sectional view of another example of the display device of FIG. 1.

FIG. 2C illustrates a cross-sectional view of another example of the display device of FIG. 1.

Referring to FIG. 1, FIG. 2A, and FIG. 2C, the biometric sensor PS may include an ultrasonic wave sensor. In this case, the sensor pixels SPXL may be implemented as a piezoelectric element PZ. A filler PIL that insulates vibration between the piezoelectric elements PZ may be filled between the piezoelectric elements PZ.

Each of the piezoelectric elements PZ may include a vibration portion and electrodes disposed to upper and lower surfaces of the vibration portion. The vibration portion may include a material such as lead zirconatetitanate (PZT).

When an AC voltage having a specific frequency is applied to the electrodes of the piezoelectric elements PZ, an ultrasonic wave having a specific frequency (for example, 12 MHz) may be emitted while the vibration portion vibrates up and down.

In the valley portion of the fingerprint, due to the difference in the medium between the window WIN and the air, most of the ultrasonic wave may not pass through the window WIN and may be reflected. On the other hand, in the ridge portion of the fingerprint in contact with the window WIN, a portion of the ultrasonic wave may pass through the window WIN, and only the remaining portion of the ultrasonic wave may be reflected toward the biometric sensor PS. That is, the intensity of the ultrasonic wave incident on each of the sensor pixels SPXL may vary depending on whether it is caused by the valley or the ridge. Accordingly, the sensor pixels SPXL may output sensing signals SS having different electrical characteristics corresponding to the intensity of the ultrasonic wave.

Figure 3:
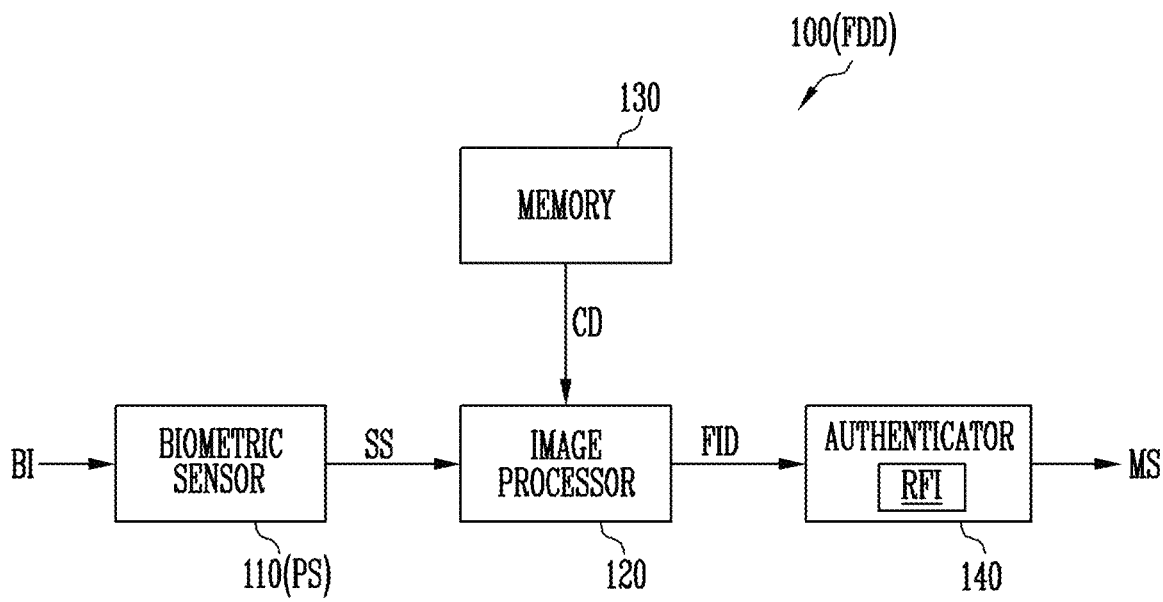
FIG. 3 illustrates an example of a fingerprint authentication device included in the display device of FIG. 1.

FIG. 3 illustrates an example of a fingerprint authentication device included in the display device of FIG. 1.

Referring to FIG. 1 and FIG. 3, a fingerprint authentication device 100 (FDD) included in the display device DD may include a biometric sensor 110 (PS), an image processor 120, a memory 130, and an authenticator 140.

The biometric sensor 110 may sense biometric information BI in order to generate a sensing signal SS. In the embodiment, the biometric sensor 110 may be the ultrasonic wave sensor or the photo sensor described with reference to FIGS. 2A, 2B, and 2C. However, this is an example, and the biometric sensor 110 is not limited thereto, and may include various types of well-known sensors. For example, the biometric sensor 110 may generate the sensing signal SS in a capacitive manner.

The image processor 120 may generate a fingerprint image FID from the sensing signal SS. In the embodiment, the image processor 120 may convert the sensing signal SS having an analog voltage level into digital data, and may generate the fingerprint image FID by using the converted digital data.

On the other hand, as described with reference to FIGS. 1, 2A, 2B, and 2C, since the fingerprint authentication device 100 according to the embodiments of the present disclosure detects or recognizes a fingerprint by using light reflected by an observation object, that is, a user's finger (or fingerprint), the sensing signal SS generated by the biometric sensor 110 may vary even for the same observation object according to the characteristic distribution of the sensor pixels SPXL included in the biometric sensor 110 (PS).

For example, the stacked thickness of the layers forming each of the sensor pixels SPXL of the biometric sensor PS described with reference to FIGS. 2A, 2B, and 2C may be different for each fingerprint sensing area FSA due to process distribution and the like (that is, the characteristics of the sensor pixel SPXL may be different for each fingerprint sensing area FSA). As an example, the stacked thicknesses of the conductive layer and the insulating layer configuring each of the sensor pixels SPXL of the biometric sensor PS may be different for each fingerprint sensing area FSA. As another example, when the biometric sensor PS is implemented as the ultrasonic wave fingerprint sensor described with reference to FIG. 2C, the stacked thicknesses of the vibrator and the electrodes configuring each of the piezoelectric elements PZ may be different for each fingerprint sensing area FSA. In this case, the amount of reflected light incident to the sensor pixels SPXL or the intensity of the ultrasonic wave may vary for each fingerprint sensing area FSA. In this case, when the image processor 120 generates the fingerprint image FID from the sensing signal SS generated by the sensor pixel SPXL without separate calibration, distortion (for example, non-uniformity) of the fingerprint image FID may occur.

Accordingly, the image processor 120 according to the embodiments of the present disclosure may calibrate the sensing signal SS provided from the biometric sensor 110 by using calibration data CD provided from the memory 130 to generate the fingerprint image FID.

The memory 130 may store the calibration data CD.

In the embodiment, the calibration data CD may include information on a coefficient (or calibration coefficient) of a calibration function corresponding to the characteristic distribution (or characteristic function) of the sensor pixels SPXL. In this case, the capacity of the calibration data CD stored in the memory 130 may be minimized. For example, compared to the case in which data for calibrating the sensing signal SS (or the fingerprint image FID) corresponding to each sensor pixel SPXL is stored in the memory 130, when the calibration coefficient values are stored in the memory 130 in the form of calibration data CD, the storage capacity of the memory 130 may be minimized.

The calibration data CD will be described in more detail with reference to FIGS. 4, 5, 6, 7, 8A, 8B, 8C, and 8D.

The image processor 120 may extract a calibration function by using the calibration data CD (that is, calibration coefficient values) provided from the memory 130, may calibrate the sensing signal SS by using the calibration function, and may generate the fingerprint image FID based on the calibrated sensing signal SS.

The authenticator 140 may perform fingerprint authentication by comparing the fingerprint image FID with registered fingerprint information RFI. The authenticator 140 may output a fingerprint authentication result as a matching signal MS.

In the embodiment, the authenticator 140 may calculate a similarity between characteristic information of the fingerprint image FID and the registered fingerprint information RFI. For example, the characteristic information of the fingerprint image FID and the registered fingerprint information RFI may include at least one of minutiae information, scale-invariant feature transform (SIFT) information, and phase information extracted based on a frequency domain transformation method.

Here, when the similarity is equal to or greater than a predetermined threshold value, the authenticator 140 may approve the corresponding fingerprint. Conversely, when the similarity is less than the threshold value, the authenticator 140 may disapprove the corresponding fingerprint to generate an authentication retry instruction.

Figure 4:
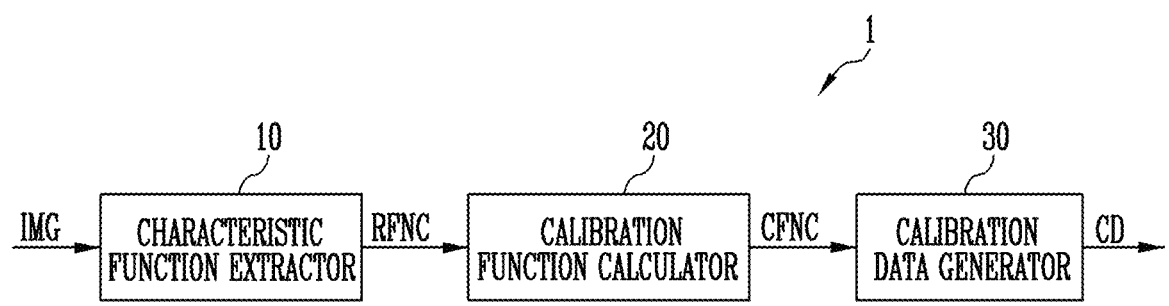
FIG. 4 illustrates a block diagram of a calibration device of a fingerprint authentication device according to embodiments of the present disclosure.
Figure 5:
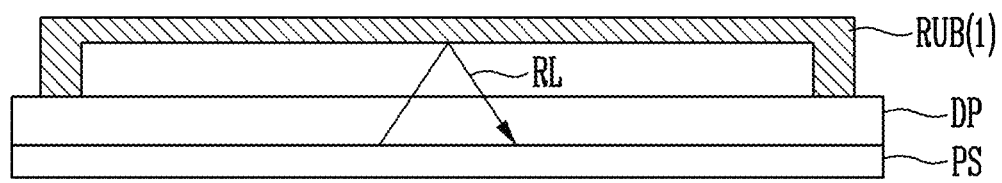
FIG. 5 is a drawing for explaining a calibration device of a fingerprint authentication device according to embodiments of the present disclosure.
Figure 6:
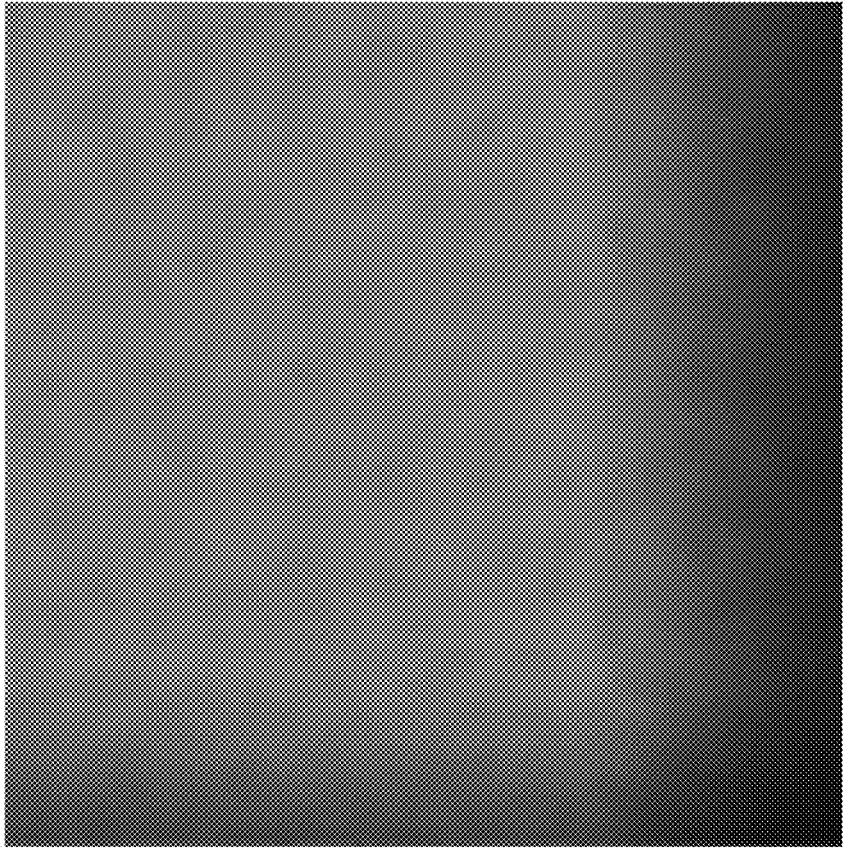
FIG. 6 illustrates an example of a test image obtained by the calibration device of the fingerprint authentication device of FIG. 4.
Figure 6:
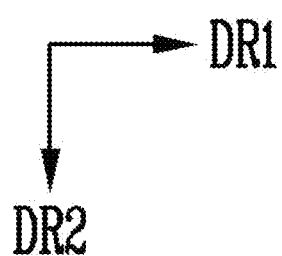
Figure 7:
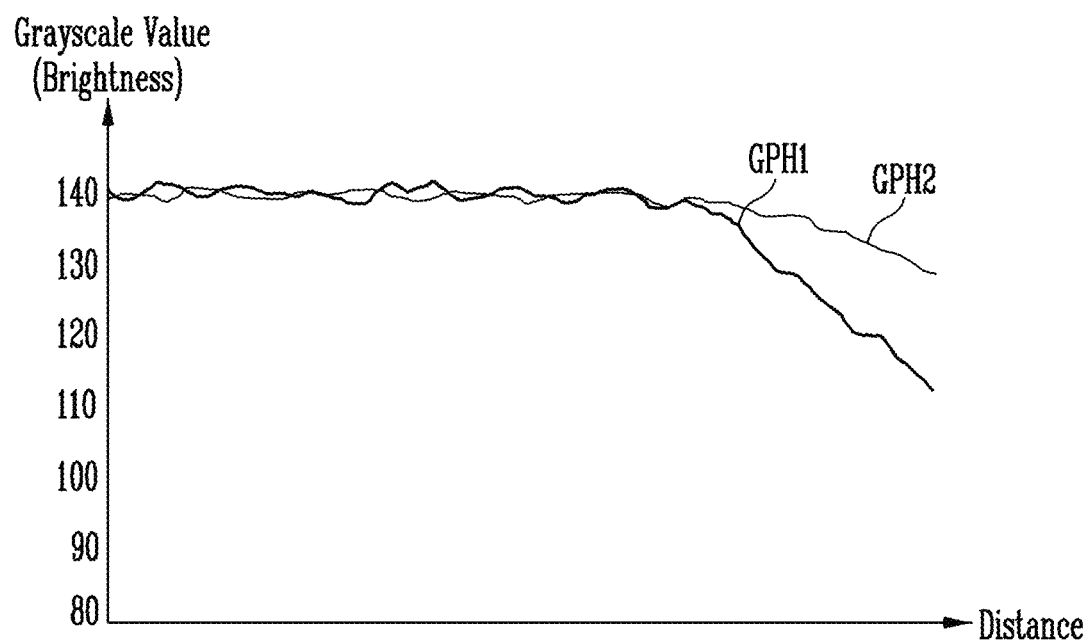
FIG. 7 illustrates a graph of brightness versus distance on the test image of FIG. 6.

FIG. 4 illustrates a block diagram of a calibration device of a fingerprint authentication device according to embodiments of the present disclosure. FIG. 5 is a drawing for explaining a calibration device of a fingerprint authentication device according to embodiments of the present disclosure. FIG. 6 illustrates an example of a test image obtained by the calibration device of the fingerprint authentication device of FIG. 4. FIG. 7 illustrates a graph of brightness versus distance on the test image of FIG. 6. FIGS. 8A, 8B, 8C, and 8D are drawings for explaining an example of an operation of the calibration device of the fingerprint authentication device of FIG. 4. FIGS. 9A and 9B are drawings for explaining a change in distribution of brightness for each position of an image calibrated by the calibration device of the fingerprint authentication device of FIG. 4.

Referring to FIG. 1 and FIG. 5, a calibration device 1 of the fingerprint authentication device may generate the calibration data CD for the biometric sensor PS by using a test image IMG for the biometric sensor PS.

In the embodiment, the calibration device 1 of the fingerprint authentication device may include a reflector RUB, and may obtain the test image IMG by using the reflector RUB.

For example, the reflector RUB may be an object having a reflective surface opposite to one (for example, a front surface) of both surfaces of the display panel DP that an observation object (for example, a user's finger) contacts. The reflective surface may be parallel to the one surface of the display panel DP. The reflective surface may be a flat surface having no curvature.

In the embodiment, the reflector RUB may be disposed on one surface of the display panel DP to generate the calibration data CD for the biometric sensor PS, and may be disposed to overlap the biometric sensor PS in a thickness direction thereof. That is, the reflector RUB may be disposed to cover the biometric sensor PS so that it may reflect the light emitted from the light source or the pixels PXL or the ultrasonic wave emitted from the sensor pixels SPXL (or the piezoelectric elements PZ) to be incident on the biometric sensor PS.

The reflector RUB is one that assumes an observation object that is a sensing target of the biometric sensor PS, that is, a user's finger, and may include a material having a predetermined reflectivity.

The calibration device 1 of the fingerprint authentication device may obtain the test image IMG by using reflected light RL reflected by the reflector RUB.

For example, as described with reference to FIG. 1 and FIG. 2A, when the biometric sensor PS is implemented as a photo sensor (or photo fingerprint sensor), the reflected light RL emitted from the light source or the pixels PXL (see FIG. 2A) and reflected by the reflector RUB may be incident on the sensor pixels SPXL (see FIG. 2A), and the calibration device 1 of the fingerprint authentication device may obtain the test image IMG for the biometric sensor PS by using the reflected light RL.

As another example, as described with reference to FIG. 1 and FIG. 2C, when the biometric sensor PS is implemented as an ultrasonic sensor (or ultrasonic fingerprint sensor), the reflected light RL (that is, the reflected ultrasonic wave) emitted from the sensor pixels SPXL (see FIG. 2C) (or the piezoelectric elements PZ (see FIG. 2C)) and reflected by the reflector RUB may be incident on the sensor pixels SPXL (see FIG. 2C), and the calibration device 1 of the fingerprint authentication device may obtain the test image IMG for the biomenic sensor PS by using the reflected light RL (the reflected ultrasonic wave).

Here, the configuration for obtaining the test image IMG may be substantially equal to the configuration in which the fingerprint authentication device 100 described with reference to FIG. 3 generates the sensing signal SS by using the biometric information BI and generates the fingerprint image FID based on the generated sensing signal SS.

In the embodiment, the reflector RUB may have the same reflectivity in the entire area (or the fingerprint sensing area FSA). That is, when the reflected light RL (or the reflected ultrasonic wave) is reflected from the reflector RUB, the reflector RUB may have the same reflectivity in the entire area (or the fingerprint sensing area FSA) so as to have the same amount of light (or intensity) in the entire area (or the fingerprint sensing area FSA).

However, as described with reference to FIGS. 1, 2A, 2B, 2C, and 3, even if the reflected light RL (or the reflected ultrasonic wave) has the same light amount (or intensity) immediately after reflected on the reflector RUB, the amount of the reflected light RL incident to the sensor pixels SPXL or the intensity of the reflected light RL (or the reflected ultrasonic wave) may vary for each area (that is, the fingerprint sensing area FSA) according to the characteristic distribution of the sensor pixels SPXL included in the biometric sensor PS.

For example, referring further to FIG. 6 and FIG. 7, FIG. 6 illustrates the test image IMG obtained by the calibration device 1 of the fingerprint authentication device by using the reflector RUB, and FIG. 7 illustrates a first graph GPH1 representing an average grayscale value (or average brightness) with respect to a distance along a first direction DR1 of the test image IMG of FIG. 6 and a second graph GPH2 representing an average grayscale value (or average brightness) with respect to a distance along a second direction DR2.

As shown in FIG. 6, the grayscale value of the test image IMG may vary for each area according to the characteristic distribution of the sensor pixels SPXL.

For example, as shown in the first graph GPH1 of FIG. 7, the average grayscale value with respect to the distance along the first direction DR1 of the test image IMG may have a tendency to decrease toward the first direction DR1.

Similarly, as shown in the second graph GPH2 of FIG. 7, the average grayscale value with respect to the distance along the second direction DR2 of the test image IMG may have a tendency to decrease toward the second direction DR2.

As described above, even if the reflected light RL (or the reflected ultrasonic wave) has the same light amount (or intensity) immediately after reflected on the reflector RUB, when the amount of the reflected light RL incident to the sensor pixels SPXL or the intensity of the reflected light RL (or the reflected ultrasonic wave) varies according to the characteristic distribution of the sensor pixels SPXL, the brightness of the test image IMG (that is, the grayscale value) may vary for each region.

Accordingly, the calibration device 1 of the fingerprint authentication device according to the embodiments of the present disclosure may generate the calibration data CD for calibrating the characteristic distribution of the sensor pixels SPXL described above.

Referring back to FIG. 4 for a more detailed description, the calibration device 1 of the fingerprint authentication device may include a characteristic function extractor 10, a calibration function calculator 20, and a calibration data generator 30.

The characteristic function extractor 10 may extract a characteristic function RFNC based on the test image IMG.

In the embodiment, the characteristic function extractor 10 may extract a first characteristic function representing a characteristic value (or a first characteristic value) with respect to the distance along the first direction DR1 of the test image IMG by using the graph (that is, the first graph GPH1 of FIG. 7) representing the average grayscale value with respect to the distance along the first direction DR1 of the test image IMG. In addition, the characteristic function extractor 10 may extract a second characteristic function representing a characteristic value (or a second characteristic value) with respect to the distance along the second direction DR2 of the test image IMG by using the graph (that is, the second graph GPH2 of FIG. 7) representing the average grayscale value with respect to the distance along the second direction DR2 of the test image IMG. Here, the first characteristic value may correspond to an average grayscale value in the first graph GPH1 (see FIG. 7), and the second characteristic value may correspond to an average grayscale value in the second graph GPH2 (see FIG. 7).

Figure 8A:
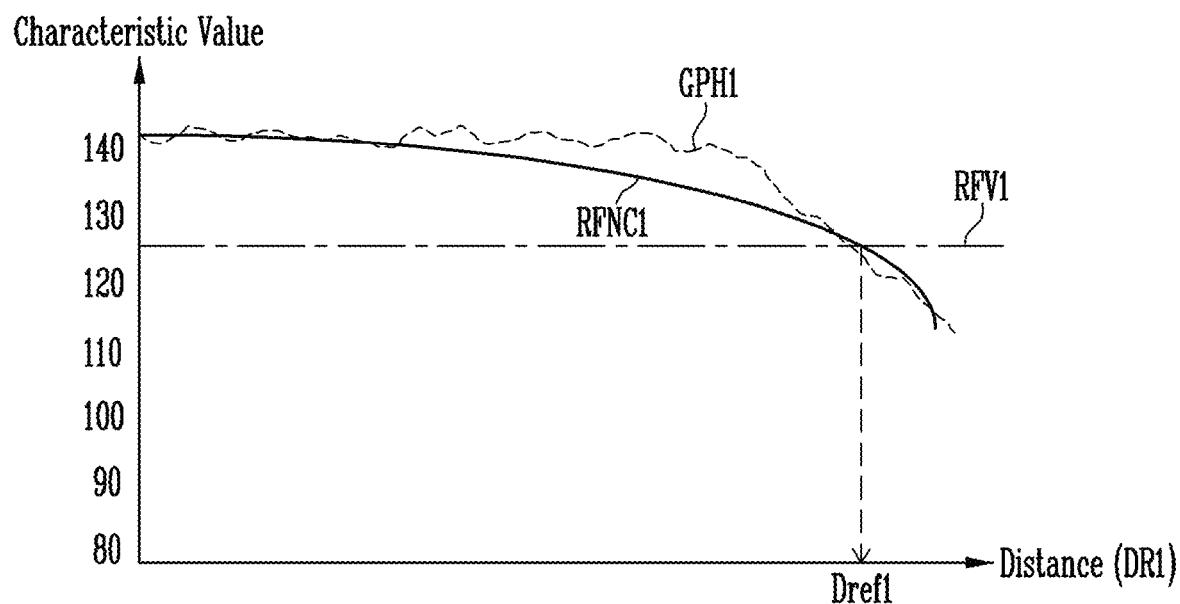
FIGS. 8A, 8B, 8C, and 8D are drawings for explaining an example of an operation of the calibration device of the fingerprint authentication device of FIG. 4.
Figure 9A:
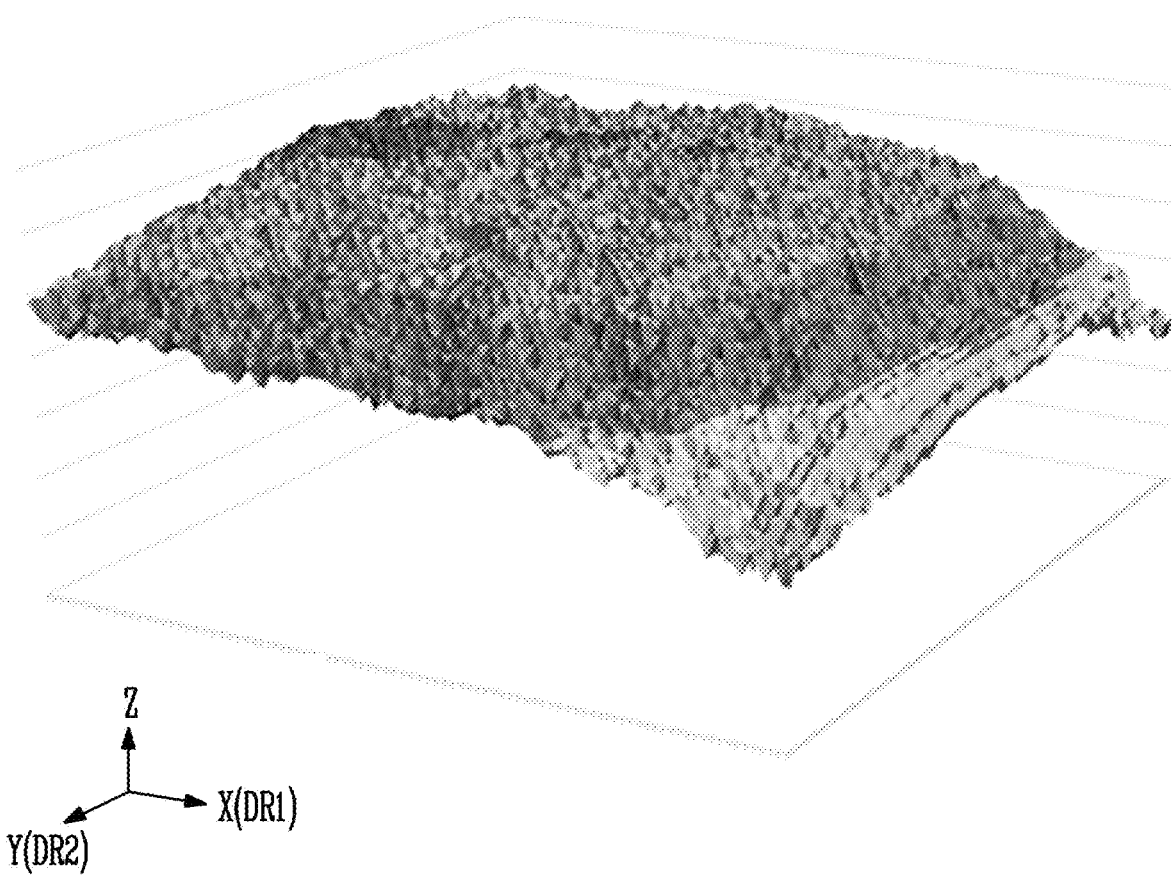
FIGS. 9A and 9B are drawings for explaining a change in distribution of brightness for each position of an image calibrated by the calibration device of the fingerprint authentication device of FIG. 4.
Figure 9B:
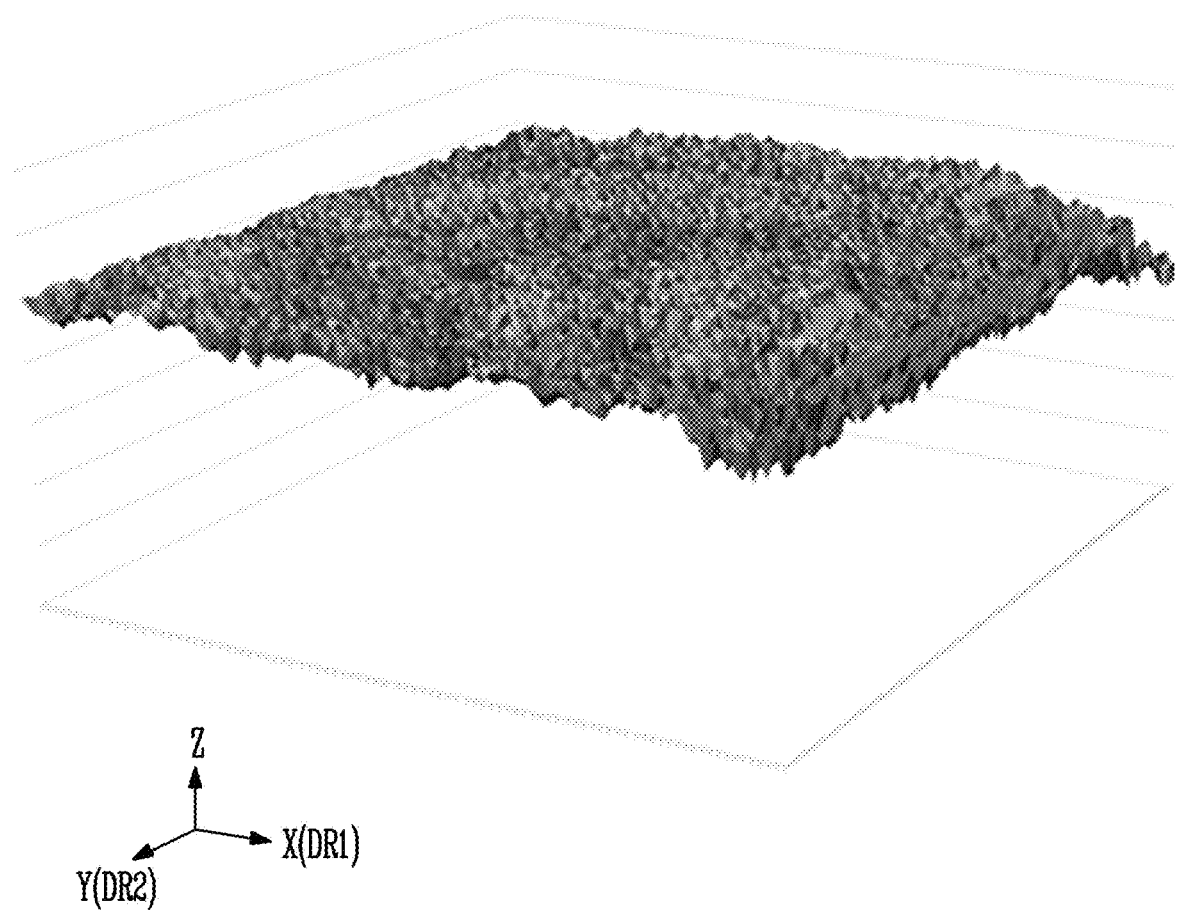

For example, referring further to FIG. 8A, the characteristic function extractor 10 may generate a first characteristic function RFNC1 by converting the first graph GPH1 into a multi-order function.

In the embodiment, the characteristic function extractor 10 may generate the first characteristic function RFNC1 by converting the first graph GPH1 into a quadratic function. That is, the first characteristic function RFNC1 may have a form of "$y=Ax^2+Bx+C$".

For example, the characteristic function extractor 10 may generate the first characteristic function RFNC1 by converting the first graph GPH1 into a quadratic function by using three coordinate values of the first graph GPH1. Here, since the first characteristic function RFNC1 has the form of "$y=Ax^2+Bx+C$" that is a quadratic function, coefficients (that is, A, B, and C) of the quadratic function of "$y=AX2+BX+C$" may be calculated through three coordinate values of the first graph GPH1 (wherein, B and C are real numbers and A is a real number that is not zero). For example, the three coordinate values may include a coordinate value with a minimum distance along the first direction DR1, a coordinate value with a maximum distance along the first direction DR1, and a coordinate value with an intermediate distance along the first direction DR1, but the embodiment of the present disclosure is not limited thereto.

However, the configuration in which the characteristic function extractor 10 generates the first characteristic function RFNC1 is not limited thereto. For example, the characteristic function extractor 10 may convert the first graph GPH1 into a linear function to generate the first characteristic function RFNC1, or may convert the first graph GPH1 into a higher-order function (for example, a multi-order function of a third-order or more) to generate the first characteristic function RFNC1.

Figure 8B:
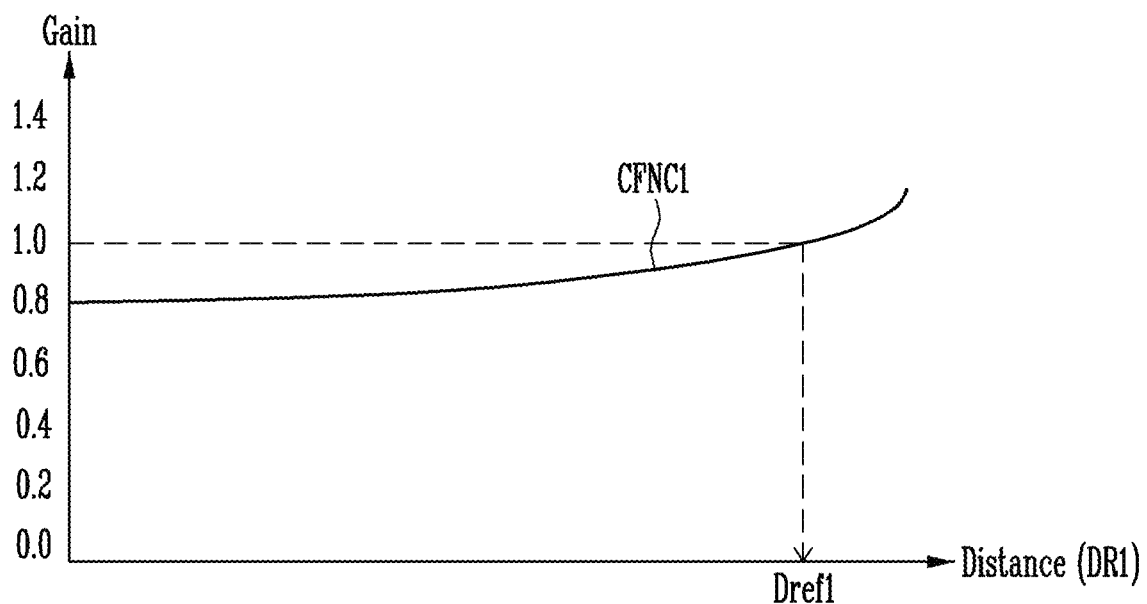
Figure 8C:
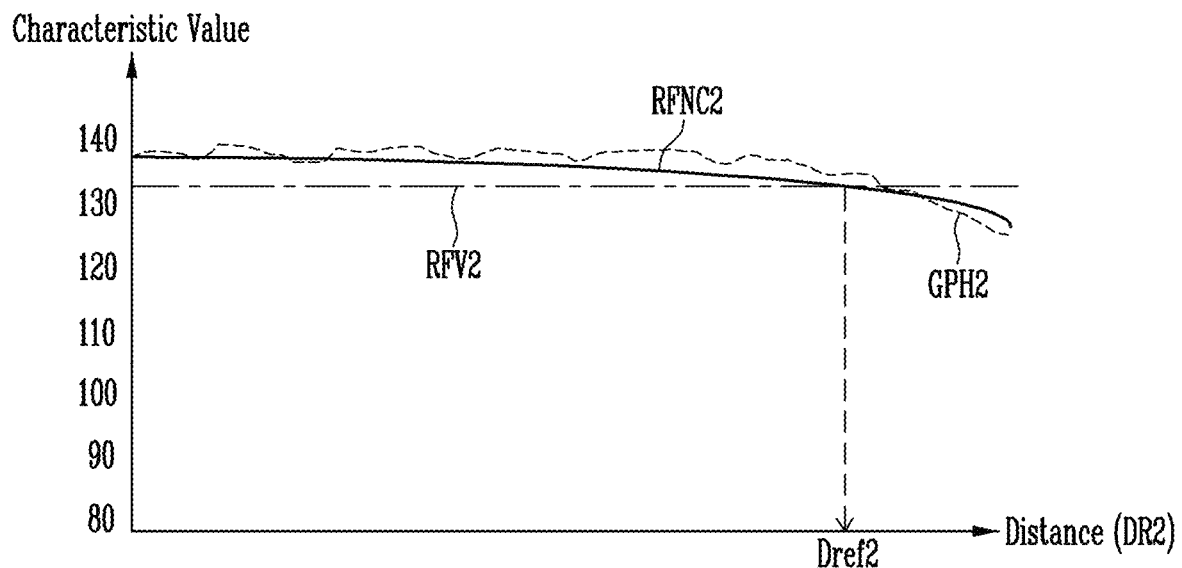

Similarly, referring further to FIG. 8C, the characteristic function extractor 10 may generate a second characteristic function RFNC2 by converting the second graph GPH2 into a multi-order function.

In the embodiment, the characteristic function extractor 10 may generate the second characteristic function RFNC2 by converting the second graph GPH2 into a quadratic function. That is, the second characteristic function RFNC2 may have a form of "$y=Dx^2+Ex+F$" (wherein, E and F are real numbers, and D is a real number that is not 0).

Here, the configuration in which the characteristic function extractor 10 generates the second characteristic function RFNC2 is substantially equal to or similar to the configuration in which the characteristic function extractor 10 described with reference to FIG. 8A generates the first characteristic function RFNC1, so a duplicate description thereof will not be repeated.

The characteristic function extractor 10 may provide the characteristic function RFNC (for example, the first characteristic function RFNC1 of FIG. 8A and the second characteristic function RFNC2 of FIG. 8C) to the calibration function calculator 20.

The calibration function calculator 20 may calculate a calibration function CFNC by using the characteristic function RFNC.

In the embodiment, the calibration function calculator 20 may calculate a reference value (or a first reference value) from the first characteristic function RFNC1 (see FIG. 8A), and may calculate a first compensation function by using the first characteristic function RFNC1 (see FIG. 8A) and the first reference value. In addition, the calibration function calculator 20 may calculate a reference value (or a second reference value) from the second characteristic function RFNC2 (see FIG. 8C), and may calculate a second compensation by using the second characteristic function RFNC2 (see FIG. 8C) and the second reference value. Here, the first compensation function may be a function of a gain (or first gain) with respect to a distance along the first direction DR1, and the second compensation function may be a function of a gain (or second gain) with respect to a distance along the second direction DR2.

For example, referring further to FIG. 8A, the calibration function calculator 20 may calculate a first reference value RFV1 from the first characteristic function RFNC1. Here, the first reference value RFV1 may be an average value of characteristic values (that is, y-axis values) of the first characteristic function RFNC1. However, the present disclosure is not limited thereto, and the first reference value RFV1 may be variously set based on the characteristic values of the first characteristic function RFNC1.

Here, referring further to FIG. 8B, the calibration function calculator 20 may symmetrically move the first characteristic function RFNC1 with the first reference value RFV1 as a symmetry axis, and may convert the y-axis value into a gain value (or the first gain value) to calculate a first calibration function CFNC1.

For example, the calibration function calculator 20 may convert the y-axis value of the symmetrically moved function into the gain value, by setting the y-axis value for a first reference distance Dref1 of the symmetrically moved function to the gain value of 1 corresponding to a coordinate value (that is, a coordinate value in which the distance is the first reference distance Dref1) in which the function in which the first characteristic function RFCN1 is symmetrically moved has the first reference value RFV1 as the y-axis value.

Here, the first calibration function CFNC1 is a function calculated by symmetrically moving the first characteristic function RFNC1 that is a quadratic function, so the first calibration function CFNC1 may also have a form of "$y=A'x^2+B'x+C'$" that is a quadratic function (wherein B' and C' are real numbers, and A' is a real number that is not 0).

Similarly, referring further to FIG. 8C, the calibration function calculator 20 may calculate a second reference value RFV2 from the second characteristic function RFNC2. Here, the second reference value RFV2 may be an average value of characteristic values (that is, y-axis values) of the second characteristic function RFNC2.

Figure 8D:
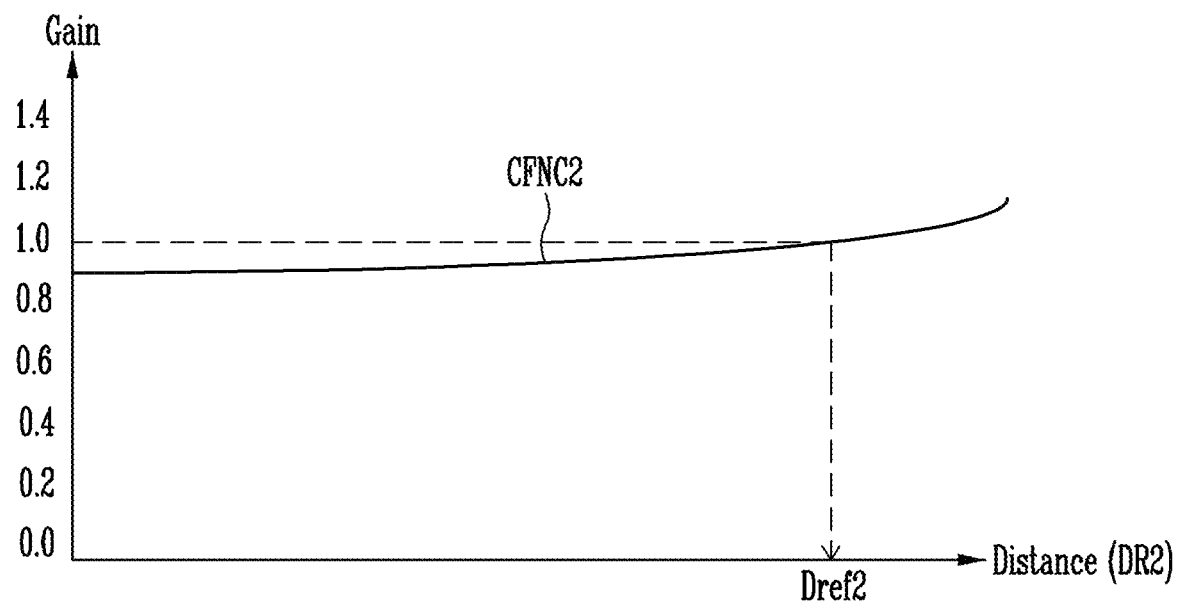

Here, referring further to FIG. 8D, the calibration function calculator 20 may symmetrically move the second characteristic function RFNC2 with the second reference value RFV2 as a symmetry axis, and may convert the y-axis value into a gain value (or the second gain value) to calculate the second calibration function CFNC2.

For example, the calibration function calculator 20 may convert the y-axis value of the symmetrically moved function into the gain value, by setting the y-axis value for a second reference distance Dref2 of the symmetrically moved function to the gain value of 1 corresponding to a coordinate value (that is, a coordinate value in which the distance is the second reference distance Dref2) in which the function in which the second characteristic function RFCN2 is symmetrically moved has the second reference value RFV2 as the y-axis value.

Here, the second calibration function CFNC2 is a function calculated by symmetrically moving the second characteristic function RFNC2 that is a quadratic function, so the second calibration function CFNC2 may also have a form of "$y=D'x^2+E'x+F'$" that is a quadratic function (wherein E' and F' are real numbers, and F' is a real number that is not 0).

The calibration function extractor 20 may provide the calibration function CFNC (for example, the first calibration function CFNC1 of FIG. 8B and the second calibration function CFNC2 of FIG. 8D) to the calibration function calculator 30.

The calibration data generator 30 may generate the calibration data CD based on the calibration function CFNC.

In the embodiment, the calibration data generator 30 may extract a coefficient value (or a calibration coefficient value) of the calibration function CFNC, and may generate information about the calibration coefficient value as the calibration data CD.

For example, the calibration data generator 30 may generate the first calibration coefficient value and the second calibration coefficient value (that is, A' to F') as the calibration data CD by extracting A', B', and C' that are the calibration coefficient values (or the first calibration coefficient values) of the first calibration function CFNC1 in the form of "$y=A'x^2+B'x+C'$" that is a quadratic function and by extracting D', E', and F' that are the calibration coefficient values (or the second calibration coefficient values) of the second calibration function CFNC2 in the form of "$y=D'x^2+E'x+F'$" that is a quadratic function As such, the calibration data CD may be stored in the memory 130 described with reference to FIG. 3, and the image processor 120 may use the calibration data CD stored in the memory 130 to extract the calibration function CFNC. For example, the image processor 120 may extract the first calibration function CFNC1 by using the first calibration coefficient values (that is, A', B', and C') among the calibration coefficient values included in the calibration data CD, and may extract the second calibration function CFNC2 by using the first calibration coefficient values (that is, D', E', and F') among the calibration coefficient values included in the calibration data CD.

Here, the image processor 120 may calibrate the sensing signal SS by using the gain value (or the first gain value) of the first calibration function CFNC1 in response to the first direction DR1 with respect to the sensing signal SS, and may calibrate the sensing signal SS by using the gain value (or the second gain value) of the second calibration function CFNC1 in response to the second direction DR2 with respect to the sensing signal SS. For example, the image processor 120 may calibrate the analog voltage value of the sensing signal SS by using the first gain value of the first calibration function CFNC1 and the second gain value of the second calibration function CFNC2.

In addition, as described with reference to FIG. 3, the image processor 120 may generate the fingerprint image FID based on the calibrated sensing signal SS (that is, the sensing signal SS calibrated based on the calibration function CFNC).

Here, the calibration function CFNC is calculated by symmetrically shifting with respect to the reference value based on the characteristic function RFNC, so that in the fingerprint image FID generated based on the calibrated sensing signal SS, the deviation (or non-uniformity) of the brightness (or grayscale value) between the area having relatively dark brightness and the area having relatively bright brightness may be improved according to the characteristic distribution of the sensor pixels SPXL.

Accordingly, the distortion of the fingerprint image FID according to the characteristic distribution of the sensor pixels SPXL (for example, the non-uniformity of the brightness (grayscale value) of the fingerprint image FID) may be compensated.

For example, referring to FIG. 9A and FIG. 9B, FIG. 9A illustrates the distribution of the brightness (or grayscale value) (corresponding to the Z-axis in FIG. 9A) of the fingerprint image FID to which no compensation is applied, and FIG. 9B illustrates the distribution of the brightness (or grayscale value) (corresponding to the Z-axis in FIG. 9B) of the fingerprint image FID generated based on the sensing signal SS compensated according to the calibration data CD according to the embodiments of the present disclosure.

As illustrated in FIG. 9A and FIG. 9B, in the fingerprint image FID generated based on the sensing signal SS compensated according to the calibration data CD according to the embodiments of the present disclosure, the deviation (or non-uniformity) of the brightness (or grayscale values) along the first direction DR1 (or X-axis) and along the second direction DR2 (or Y-axis) may be improved (compensated). For example, as depicted in FIG. 9B, the fingerprint image FID based on the sensing signal SS compensated according to the calibration data CD may have more flatter surface profile along the first direction DR1 (or X-axis) and the second direction DR2 (or Y-axis) than the fingerprint image FID with no compensation depicted in FIG. 9A.

In addition, since the calibration data CD stored in the memory 130 is stored in the form of the calibration coefficient values, compared to the case in which the data for calibration corresponding to each sensor pixel SPXL is stored in the memory 130, the storage capacity of the memory 130 may be minimized.

Figure 10:
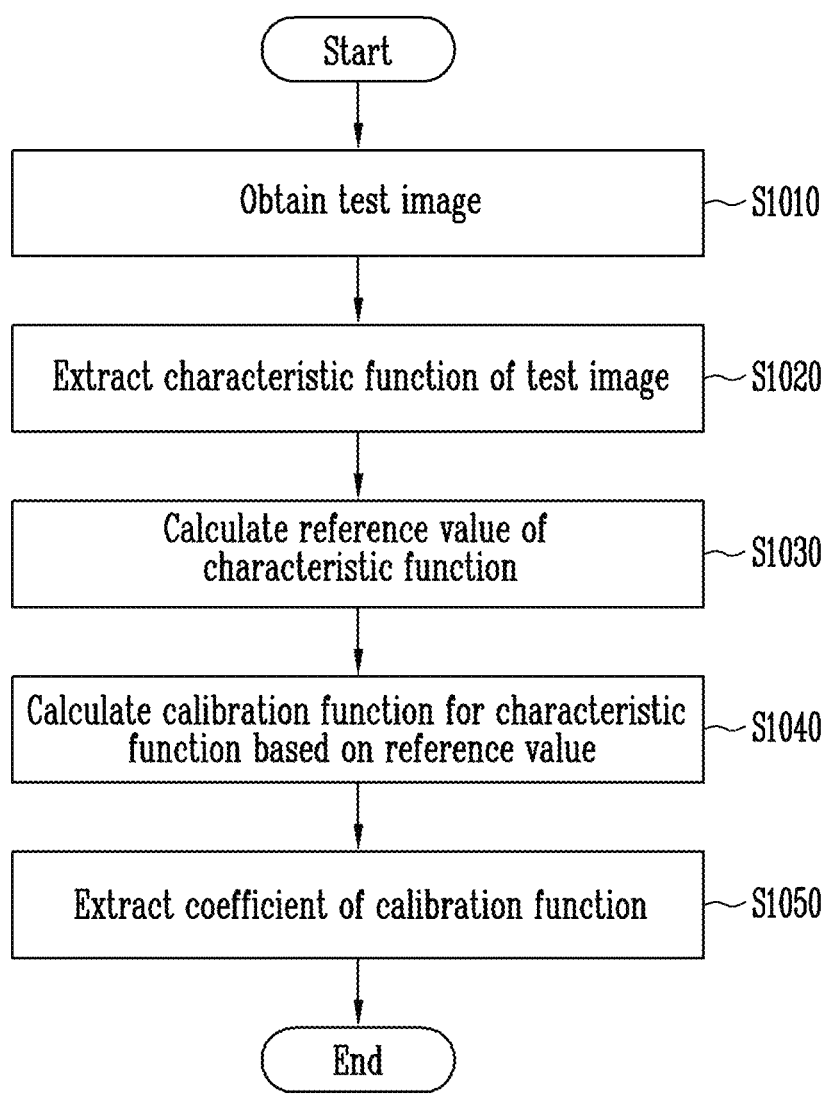
FIG. 10 illustrates a flowchart of a calibration method of a fingerprint authentication device according to embodiments of the present disclosure.

FIG. 10 illustrates a flowchart of a calibration method of a fingerprint authentication device according to embodiments of the present disclosure. On the other hand, since the calibration method of the fingerprint authentication device according to the embodiments of the present disclosure of FIG. 10 is performed by using the calibration device 1 of the fingerprint authentication device of FIG. 4, hereinafter, descriptions that are redundant with those described with reference to FIGS. 4, 5, 6, 7, 8A, 8B, 8C, and 8D will not be repeated.

Referring to FIG. 10, the calibration method of the fingerprint authentication device of FIG. 10 may include obtaining a test image (S1010), extracting a characteristic function of a test image (S1020), calculating a reference value of the characteristic function (S1030), calculating a calibration function for the characteristic function based on the reference value (S1040), and extracting a coefficient of the calibration function (S1050).

The obtaining of the test image (S1010) may be a step in which the calibration device 1 of the fingerprint authentication device described with reference to FIGS. 4, 5, and 6 obtains the test image IMG for the fingerprint authentication device 100 by using the reflector RUB.

The extracting of the characteristic function of the test image (S1020) may be a step in which the characteristic function extractor 10 described with reference to FIG. 4, FIG. 8A, and FIG. 8C extracts the characteristic function RFNC based on the test image IMG.

The calculating of the reference value of the characteristic function (S1030) may be a step in which the calibration function calculator 20 described with reference to FIG. 4, FIG. 8A, and FIG. 8C calculates the reference value based on the characteristic function RFNC.

The calculating of the calibration function for the characteristic function based on the reference value (S1040) may be a step in which the calibration function calculator 20 described with reference to FIG. 4, FIG. 8A, and FIG. 8D calculates the calibration function CFNC based on the characteristic function RFNC and the reference value.

The extracting of the coefficient of the calibration function (S1050) may be a step in which the calibration data generator 30 described with reference to FIG. 4, FIG. 8B, and FIG. 8D generate the calibration data CD by extracting the calibration coefficient of the calibration function CFNC.

The fingerprint authentication device according to the embodiments of the present disclosure may calibrate a fingerprint image by using calibration data. Accordingly, distortion of a fingerprint image according to characteristic distribution of sensor pixels may be compensated.

In addition, since calibration data includes only information about a coefficient of a calibration function corresponding to characteristic distribution of sensor pixels, storage capacity of a memory of the fingerprint authentication device for storing the calibration data may be minimized.

However, the effects of the present disclosure are not limited to the above-described effects, and may be variously extended without departing from the spirit and scope of the present disclosure.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A fingerprint authentication device, comprising:
    a biometric sensor that senses biometric information to generate a sensing signal;
    an image processor that extracts a calibration function based on calibration data and generates a fingerprint image based on the calibration function and the sensing signal; and
    an authenticator that performs fingerprint authentication by comparing the fingerprint image and registered fingerprint information,
    wherein the calibration data includes information on a calibration coefficient of the calibration function, and wherein the calibration function includes a first calibration function having a first gain value with respect to a distance along a first direction of the fingerprint image and a second calibration function having a second gain value with respect to a distance along a second direction different from the first direction of the fingerprint image.

2. The fingerprint authentication device of claim 1, wherein the calibration coefficient includes a first calibration coefficient value of the first calibration function and a second calibration coefficient value of the second calibration function.

3. The fingerprint authentication device of claim 2, wherein each of the first calibration function and the second calibration function is a multi-order function.

4. The fingerprint authentication device of claim 3, wherein the image processor extracts the multi-order function having the first calibration coefficient value as the first calibration function, and extracts the multi-order function having the second calibration coefficient value as the second calibration function.

5. The fingerprint authentication device of claim 4, wherein the sensing signal has an analog voltage level, and
wherein the image processor calibrates the analog voltage level of the sensing signal corresponding to the first direction based on the first gain value of the first calibration function, and calibrates the analog voltage level of the sensing signal corresponding to the second direction based on the second gain value of the second calibration function.

6. The fingerprint authentication device of claim 1, further comprising:
a memory that stores the calibration data.

7. A calibration device of a fingerprint authentication device, comprising:
a characteristic function extractor that receives a test image with respect to the fingerprint authentication device and extracts a characteristic function of the test image;
a calibration function calculator that calculates a reference value of the characteristic function and calculates a calibration function based on the characteristic function and the reference value; and
a calibration data generator that generates calibration data by extracting a calibration coefficient of the calibration function,
wherein the characteristic function includes a first characteristic function and a second characteristic function, and
wherein the characteristic function extractor extracts:
the first characteristic function having a first characteristic value with respect to a distance along a first direction based on an average grayscale value with respect to the distance along the first direction of the test image; and
the second characteristic function having a second characteristic value with respect to a distance along a second direction based on an average grayscale value with respect to the distance along the second direction different from the first direction of the test image.

8. The calibration device of the fingerprint authentication device of claim 7, wherein each of the first characteristic function and the second characteristic function is a multi-order function.

9. The calibration device of the fingerprint authentication device of claim 7, wherein the reference value includes a first reference value and a second reference value, and
wherein the calibration function calculator calculates an average value of the first characteristic value as the first reference value and an average value of the second characteristic value as the second reference value.

10. The calibration device of the fingerprint authentication device of claim 9, wherein the calibration function includes a first calibration function and a second calibration function, and
wherein the calibration function calculator calculates:
the first calibration function having a first gain value with respect to a distance along the first direction by symmetrically shifting the first characteristic function based on the first reference value; and
the second calibration function having a second gain value with respect to a distance along the second direction by symmetrically shifting the second characteristic function based on the second reference value.

11. The calibration device of the fingerprint authentication device of claim 10, wherein each of the first calibration function and the second calibration function is a multi-order function.

12. The calibration device of the fingerprint authentication device of claim 11, wherein the calibration data generator extracts a first calibration coefficient value of the first calibration function and a second calibration coefficient value of the second calibration function, and
wherein the calibration data includes the first calibration coefficient value and the second calibration coefficient value.

13. A calibration method of a fingerprint authentication device, comprising steps of:
obtaining a test image with respect to the fingerprint authentication device;
extracting a characteristic function of the test image;
calculating a reference value of the characteristic function;
calculating a calibration function based on the characteristic function and the reference value; and
extracting a coefficient of the calibration function,
wherein the characteristic function includes a first characteristic function and a second characteristic function, and
wherein the extracting of the characteristic function is accomplished by extracting the first characteristic function including a first characteristic value with respect to a distance along a first direction based on an average grayscale value with respect to the distance along the first direction of the test image, and
extracting the second characteristic function including a second characteristic value with respect to a distance along a second direction based on an average grayscale value with respect to the distance along the second direction different from the first direction of the test image.

14. The calibration method of the fingerprint authentication device of claim 13, wherein each of the first characteristic function and the second characteristic function is a multi-order function.

15. The calibration method of the fingerprint authentication device of claim 13, wherein the reference value includes a first reference value and a second reference value, and
wherein the calculating of the reference value is accomplished by calculating an average value of the first characteristic value as the first reference value, and
calculating an average value of the second characteristic value as the second reference value.

16. The calibration method of the fingerprint authentication device of claim 15, wherein the calibration function includes a first calibration function and a second calibration function, and wherein the calculating of the calibration function is accomplished by calculating the first calibration function including a first gain value with respect to a distance along the first direction by symmetrically shifting the first characteristic function based on the first reference value, and calculating the second calibration function including a second gain value with respect to a distance along the second direction by symmetrically shifting the second characteristic function based on the second reference value.

17. The calibration method of the fingerprint authentication device of claim 16, wherein each of the first calibration function and the second calibration function is a multi-order function.

18. The calibration method of the fingerprint authentication device of claim 17, wherein the extracting of the coefficient of the calibration function is accomplished by extracting a first calibration coefficient value of the first calibration function and a second calibration coefficient value of the second calibration function, and generating calibration data including the first calibration coefficient value and the second calibration coefficient value.

* * * * *